(12) United States Patent
Hill

(10) Patent No.: US 9,658,868 B2
(45) Date of Patent: *May 23, 2017

(54) CLOUD COMPUTING GATEWAY, CLOUD COMPUTING HYPERVISOR, AND METHODS FOR IMPLEMENTING SAME

(71) Applicant: CSC Agility Platform, Inc., Falls Church, VA (US)

(72) Inventor: Duncan Christopher Hill, Toronto (CA)

(73) Assignee: CSC Agility Platform, Inc., Falls Church, VA (US)

( * ) Notice: Subject to any disclaimer, the term of this patent is extended or adjusted under 35 U.S.C. 154(b) by 98 days.

This patent is subject to a terminal disclaimer.

(21) Appl. No.: 13/947,133

(22) Filed: Jul. 22, 2013

(65) Prior Publication Data

US 2013/0326516 A1 Dec. 5, 2013
US 2016/0224357 A9 Aug. 4, 2016

Related U.S. Application Data

(63) Continuation of application No. 12/488,424, filed on Jun. 19, 2009, now Pat. No. 8,514,868.

(Continued)

(51) Int. Cl.
*H04L 1/00* (2006.01)
*G06F 9/455* (2006.01)
(Continued)

(52) U.S. Cl.
CPC ...... *G06F 9/45533* (2013.01); *G06F 9/45558* (2013.01); *G06F 21/53* (2013.01);
(Continued)

(58) Field of Classification Search
CPC ......... H04L 41/12; H04L 41/13; H04L 41/14; H04L 41/15; H04L 41/16; H04L 12/18;
(Continued)

(56) References Cited

U.S. PATENT DOCUMENTS 6,012,053 A 1/2000 Pant et al.
6,321,334 B1 11/2001 Jerger et al.
(Continued)

FOREIGN PATENT DOCUMENTS

WO 9858356 12/1998
WO 2004012038 2/2004
(Continued)

OTHER PUBLICATIONS

Mellor, Ewan et al., "Xen Management API," Version: API Revision 1.0.0, Apr. 27, 2007.
(Continued)

*Primary Examiner* — Dady Chery
(74) *Attorney, Agent, or Firm* — Sheppard Mullin Richter & Hampton LLP

(57) ABSTRACT

Embodiments of the present invention provide a cloud gateway system, a cloud hypervisor system, and methods for implementing same. The cloud gateway system extends the security, manageability, and quality of service membrane of a corporate enterprise network into cloud infrastructure provider networks, enabling cloud infrastructure to be interfaced as if it were on the enterprise network. The cloud hypervisor system provides an interface to cloud infrastructure provider management systems and infrastructure instances that enables existing enterprise systems management tools to manage cloud infrastructure substantially the same as they manage local virtual machines via common server hypervisor APIs.

22 Claims, 11 Drawing Sheets

Related U.S. Application Data

(60) Provisional application No. 61/074,027, filed on Jun. 19, 2008.

(51) Int. Cl.
*H04L 12/66* (2006.01)
*H04L 29/06* (2006.01)
*H04L 29/08* (2006.01)
*G06F 21/53* (2013.01)

(52) U.S. Cl.
CPC .......... *H04L 12/66* (2013.01); *H04L 63/0272* (2013.01); *H04L 67/10* (2013.01); *H04L 67/16* (2013.01); *H04L 67/34* (2013.01); *G06F 2009/4557* (2013.01); *G06F 2009/45562* (2013.01); *G06F 2009/45595* (2013.01); *G06F 2221/2149* (2013.01)

(58) Field of Classification Search
CPC ......... H04L 12/19; H04L 12/20; H04L 12/21; H04L 29/0653; H04L 29/0654; H04L 29/0655; H04L 29/0656; H04L 29/0657
USPC .................. 370/254, 392, 401, 503, 390; 709/226-233
See application file for complete search history.

(56) References Cited

U.S. PATENT DOCUMENTS

| | | | |
|---|---|---|---|
| 6,345,361 B1 | 2/2002 | Jerger et al. |
| 6,473,800 B1 | 10/2002 | Jerger et al. |
| 6,747,598 B2 | 6/2004 | Bajikar |
| 6,847,970 B2 | 1/2005 | Keller et al. |
| 6,880,002 B2 | 4/2005 | Hirschfeld et al. |
| 6,996,716 B1 | 2/2006 | Hsu |
| 7,003,562 B2 | 2/2006 | Mayer |
| 7,143,439 B2 | 11/2006 | Cooper et al. |
| 7,272,646 B2 | 9/2007 | Cooper et al. |
| 7,284,267 B1 | 10/2007 | McArdle et al. |
| 7,376,965 B2 | 5/2008 | Jemes et al. |
| 7,428,754 B2 | 9/2008 | Neumann et al. |
| 7,506,357 B1 | 3/2009 | Moriconi et al. |
| 7,584,301 B1 | 9/2009 | Joshi |
| 7,613,826 B2 | 11/2009 | Guichard et al. |
| 7,620,613 B1 | 11/2009 | Moore et al. |
| 7,685,261 B1 | 3/2010 | Marinelli et al. |
| 7,697,441 B2 | 4/2010 | Bansal et al. |
| 7,698,230 B1 | 4/2010 | Brown et al. |
| 7,698,430 B2 | 4/2010 | Jackson |
| 7,774,444 B1 | 8/2010 | George et al. |
| 7,836,198 B2 | 11/2010 | Cadigan, Jr. et al. |
| 7,886,031 B1 | 2/2011 | Taylor et al. |
| 8,019,849 B1 | 9/2011 | Lopilato et al. |
| 8,060,630 B1 | 11/2011 | Jancaitis et al. |
| 8,078,728 B1 | 12/2011 | Pollan et al. |
| 8,082,262 B2 | 12/2011 | Farber et al. |
| 8,117,289 B1 | 2/2012 | Miller et al. |
| 8,135,815 B2 | 3/2012 | Mayer |
| 8,230,050 B1 | 7/2012 | Brandwine et al. |
| 8,255,932 B1 | 8/2012 | Clemm et al. |
| 8,259,571 B1 | 9/2012 | Raphel et al. |
| 8,261,295 B1 | 9/2012 | Risbood et al. |
| 8,369,333 B2 | 2/2013 | Hao et al. |
| 8,434,080 B2 | 4/2013 | Yendluri |
| 8,443,069 B2 | 5/2013 | Bagepalli et al. |
| 8,448,170 B2 | 5/2013 | Wipfel et al. |
| 8,468,256 B1 | 6/2013 | McArdle et al. |
| 8,473,557 B2 | 6/2013 | Ramakrishnan et al. |
| 8,510,835 B1 | 8/2013 | Bucu et al. |
| 8,543,810 B1 | 9/2013 | Angal et al. |
| 8,782,637 B2 | 7/2014 | Khalid |
| 9,015,324 B2 | 4/2015 | Jackson |
| 2002/0010572 A1 | 1/2002 | Orton et al. |
| 2002/0016926 A1 | 2/2002 | Nguyen et al. |
| 2002/0099823 A1 | 7/2002 | Jemes et al. |
| 2002/0129128 A1 | 9/2002 | Gold et al. |
| 2002/0178246 A1 | 11/2002 | Mayer |
| 2002/0184525 A1 | 12/2002 | Cheng |
| 2003/0051021 A1 | 3/2003 | Hirschfeld et al. |
| 2003/0051201 A1 | 3/2003 | Brenna |
| 2003/0105810 A1 | 6/2003 | McCrory et al. |
| 2003/0112182 A1 | 6/2003 | Bajikar |
| 2003/0177176 A1 | 9/2003 | Hirschfeld et al. |
| 2003/0182389 A1 | 9/2003 | Edwards |
| 2003/0184474 A1 | 10/2003 | Bajikar |
| 2003/0229808 A1 | 12/2003 | Heintz et al. |
| 2004/0083295 A1 | 4/2004 | Amara et al. |
| 2004/0111643 A1 | 6/2004 | Farmer |
| 2005/0002516 A1 | 1/2005 | Shtivelman |
| 2005/0091098 A1 | 4/2005 | Brodersen et al. |
| 2005/0091353 A1 | 4/2005 | Gopisetty et al. |
| 2005/0149471 A1 | 7/2005 | Lassalle |
| 2005/0193196 A1 | 9/2005 | Huang et al. |
| 2005/0198125 A1 | 9/2005 | Beck et al. |
| 2005/0198299 A1 | 9/2005 | Beck et al. |
| 2005/0257244 A1 | 11/2005 | Joly et al. |
| 2005/0283823 A1 | 12/2005 | Okajo et al. |
| 2005/0289538 A1 | 12/2005 | Black-Ziegelbein et al. |
| 2006/0005162 A1 | 1/2006 | Tseng et al. |
| 2006/0010492 A9 | 1/2006 | Heintz et al. |
| 2006/0026123 A1 | 2/2006 | Moore et al. |
| 2006/0056297 A1 | 3/2006 | Bryson et al. |
| 2006/0059548 A1 | 3/2006 | Hildre et al. |
| 2006/0100912 A1 | 5/2006 | Kumar et al. |
| 2006/0129670 A1 | 6/2006 | Mayer |
| 2006/0129672 A1 | 6/2006 | Mayer |
| 2006/0133338 A1 | 6/2006 | Reznik et al. |
| 2006/0159116 A1 | 7/2006 | Gerszberg et al. |
| 2006/0253443 A1 | 11/2006 | Li et al. |
| 2006/0282294 A1 | 12/2006 | McComb et al. |
| 2006/0282295 A1 | 12/2006 | McComb et al. |
| 2007/0011723 A1 | 1/2007 | Chao |
| 2007/0022474 A1 | 1/2007 | Rowett et al. |
| 2007/0022479 A1 | 1/2007 | Sikdar et al. |
| 2007/0061870 A1 | 3/2007 | Ting et al. |
| 2007/0157286 A1 | 7/2007 | Singh et al. |
| 2007/0180448 A1 | 8/2007 | Low |
| 2007/0180449 A1 | 8/2007 | Croft et al. |
| 2007/0240102 A1 | 10/2007 | Bello et al. |
| 2008/0034365 A1 | 2/2008 | Dahlstedt |
| 2008/0072284 A1 | 3/2008 | Horvitz et al. |
| 2008/0215681 A1 | 9/2008 | Darcie et al. |
| 2008/0253322 A1 | 10/2008 | So et al. |
| 2008/0306798 A1 | 12/2008 | Anke et al. |
| 2009/0036111 A1 | 2/2009 | Danford et al. |
| 2009/0063415 A1 | 3/2009 | Chatfield et al. |
| 2009/0063665 A1 | 3/2009 | Bagepalli et al. |
| 2009/0085743 A1 | 4/2009 | Ravi et al. |
| 2009/0089078 A1 | 4/2009 | Bursey |
| 2009/0126999 A1 | 5/2009 | Davidson |
| 2009/0138600 A1 | 5/2009 | Baum et al. |
| 2009/0138795 A1 | 5/2009 | Liu et al. |
| 2009/0138938 A1 | 5/2009 | Harrison et al. |
| 2009/0138958 A1 | 5/2009 | Baum et al. |
| 2009/0178108 A1 | 7/2009 | Hudis et al. |
| 2009/0187927 A1 | 7/2009 | Wang et al. |
| 2009/0210929 A1 | 8/2009 | Zill et al. |
| 2009/0216999 A1 | 8/2009 | Gebhart et al. |
| 2009/0228950 A1 | 9/2009 | Reed et al. |
| 2009/0228967 A1 | 9/2009 | Gbadegesin |
| 2009/0240346 A1 | 9/2009 | Cadigan et al. |
| 2009/0265755 A1 | 10/2009 | Hamilton, II et al. |
| 2009/0276771 A1 | 11/2009 | Nickolov et al. |
| 2009/0300151 A1 | 12/2009 | Friedman et al. |
| 2009/0300169 A1 | 12/2009 | Sagar et al. |
| 2009/0300210 A1 | 12/2009 | Ferris |
| 2009/0300635 A1 | 12/2009 | Ferris |
| 2009/0307685 A1 | 12/2009 | Axnix et al. |
| 2010/0027552 A1 | 2/2010 | Hill |
| 2010/0050239 A1 | 2/2010 | Carter et al. |
| 2010/0058435 A1 | 3/2010 | Buss et al. |
| 2010/0071024 A1 | 3/2010 | Eyada |
| 2010/0169497 A1 | 7/2010 | Klimentiev et al. |

(56) References Cited

U.S. PATENT DOCUMENTS

| | | |
|---|---|---|
| 2010/0198972 A1 | 8/2010 | Umbehocker |
| 2010/0205061 A1 | 8/2010 | Karmarkar |
| 2010/0212010 A1 | 8/2010 | Stringer et al. |
| 2010/0223385 A1 | 9/2010 | Gulley et al. |
| 2010/0250497 A1 | 9/2010 | Redlich et al. |
| 2010/0275241 A1 | 10/2010 | Srinivasan |
| 2010/0287280 A1 | 11/2010 | Sivan |
| 2010/0293484 A1 | 11/2010 | Stanhope et al. |
| 2010/0293522 A1 | 11/2010 | Cifra et al. |
| 2010/0306773 A1 | 12/2010 | Lee et al. |
| 2010/0318609 A1 | 12/2010 | Lahiri et al. |
| 2010/0319004 A1 | 12/2010 | Hudson et al. |
| 2011/0004916 A1 | 1/2011 | Schiffman et al. |
| 2011/0016214 A1 | 1/2011 | Jackson |
| 2011/0016473 A1 | 1/2011 | Srinivasan |
| 2011/0075664 A1 | 3/2011 | Lambeth et al. |
| 2011/0083167 A1 | 4/2011 | Carpenter et al. |
| 2011/0099126 A1 | 4/2011 | Belani et al. |
| 2011/0125894 A1 | 5/2011 | Anderson et al. |
| 2011/0125895 A1 | 5/2011 | Anderson et al. |
| 2011/0126047 A1 | 5/2011 | Anderson et al. |
| 2011/0126099 A1 | 5/2011 | Anderson et al. |
| 2011/0126197 A1 | 5/2011 | Larsen et al. |
| 2011/0126207 A1 | 5/2011 | Wipfel et al. |
| 2011/0126275 A1 | 5/2011 | Anderson et al. |
| 2011/0138047 A1 | 6/2011 | Brown et al. |
| 2011/0153727 A1 | 6/2011 | Li |
| 2011/0161915 A1 | 6/2011 | Srinivasamoorthy et al. |
| 2011/0213869 A1 | 9/2011 | Korsunsky et al. |
| 2011/0214157 A1 | 9/2011 | Korsunsky et al. |
| 2011/0219035 A1 | 9/2011 | Korsunsky et al. |
| 2011/0231510 A1 | 9/2011 | Korsunsky et al. |
| 2011/0231552 A1 | 9/2011 | Carter et al. |
| 2011/0231564 A1 | 9/2011 | Korsunsky et al. |
| 2011/0231899 A1 | 9/2011 | Pulier et al. |
| 2011/0238855 A1 | 9/2011 | Korsunsky et al. |
| 2011/0258692 A1 | 10/2011 | Morrison et al. |
| 2011/0261828 A1 | 10/2011 | Smith |
| 2012/0005236 A1 | 1/2012 | Deng et al. |
| 2012/0005724 A1 | 1/2012 | Lee |
| 2012/0042168 A1 | 2/2012 | Yuan et al. |
| 2012/0078643 A1 | 3/2012 | Nagpal et al. |
| 2012/0084184 A1 | 4/2012 | Raleigh et al. |
| 2012/0173709 A1 | 7/2012 | Li et al. |
| 2012/0179824 A1 | 7/2012 | Jackson |
| 2012/0185821 A1 | 7/2012 | Yaseen et al. |
| 2012/0185913 A1 | 7/2012 | Martinez et al. |
| 2012/0192146 A1 | 7/2012 | Arnold et al. |
| 2012/0229499 A1 | 9/2012 | Tsao et al. |
| 2012/0239739 A1 | 9/2012 | Manglik et al. |
| 2012/0240185 A1 | 9/2012 | Kapoor et al. |
| 2012/0324069 A1 | 12/2012 | Nori et al. |
| 2013/0066940 A1 | 3/2013 | Shao |
| 2013/0067225 A1 | 3/2013 | Shochet et al. |
| 2013/0156189 A1 | 6/2013 | Gero et al. |
| 2013/0232463 A1 | 9/2013 | Nagaraja et al. |
| 2013/0263209 A1 | 10/2013 | Panuganty |
| 2013/0318341 A1 | 11/2013 | Bagepalli et al. |
| 2014/0068743 A1 | 3/2014 | Marcus et al. |
| 2014/0236745 A1 | 8/2014 | Vautour |

FOREIGN PATENT DOCUMENTS

| | | |
|---|---|---|
| WO | 2009155574 | 12/2009 |
| WO | 2011091056 | 7/2011 |
| WO | 2012069064 | 5/2012 |

OTHER PUBLICATIONS

Mellor, Ewan, "The Xen-API," Xen Summit, T.J. Watson Research Center, Apr. 18, 2007.

Qian, Ling et al., "Cloud Computing: An Overview," Proceedings of the 1st International Conference on Cloud Computing (CloudCom 2009), pp. 626-631, Dec. 1, 2009.

Wikimedia Foundation, Inc. "Enterprise Service Bus," Wikipedia online encyclopedia entry, May 29, 2008 [retrieved online at http://en.wikipedia.org/w/index.php?title=Enterprise_service_bus&oldid=215734396 on Oct. 17, 2014].

Wood, Timothy et al., "The Case for Enterprise-Ready Virtual Private Clouds," Jun. 19, 2009.

Wood, Timothy, "Improving Data Center Resource Management, Deployment, and Availability with Virtualization," Jun. 2009.

European Patent Application No. EP09767882.5, Extended Search Report mailed Jul. 14, 2011.

International Application No. PCT/US2009/048052, International Search Report and Written Opinion mailed Aug. 20, 2009.

International Application No. PCT/US2011/021741, International Search Report and Written Opinion mailed May 13, 2011.

International Application No. PCT/US2012/021921, International Search Report and Written Opinion mailed Jul. 30, 2012.

International Application No. PCT/US2014/030536, International Search Report and Written Opinion mailed Aug. 18, 2014.

International Application No. PCT/US2014/030599, International Search Report and Written Opinion mailed Aug. 28, 2014.

Singapore Patent Application No. 201009380-5, Written Opinion mailed Mar. 28, 2012.

European Patent Application No. EP14764916.4, Extended Search Report mailed Sep. 27, 2016.

European Patent Application No. EP14762867.1, Extended Search Report mailed Oct. 17, 2016.

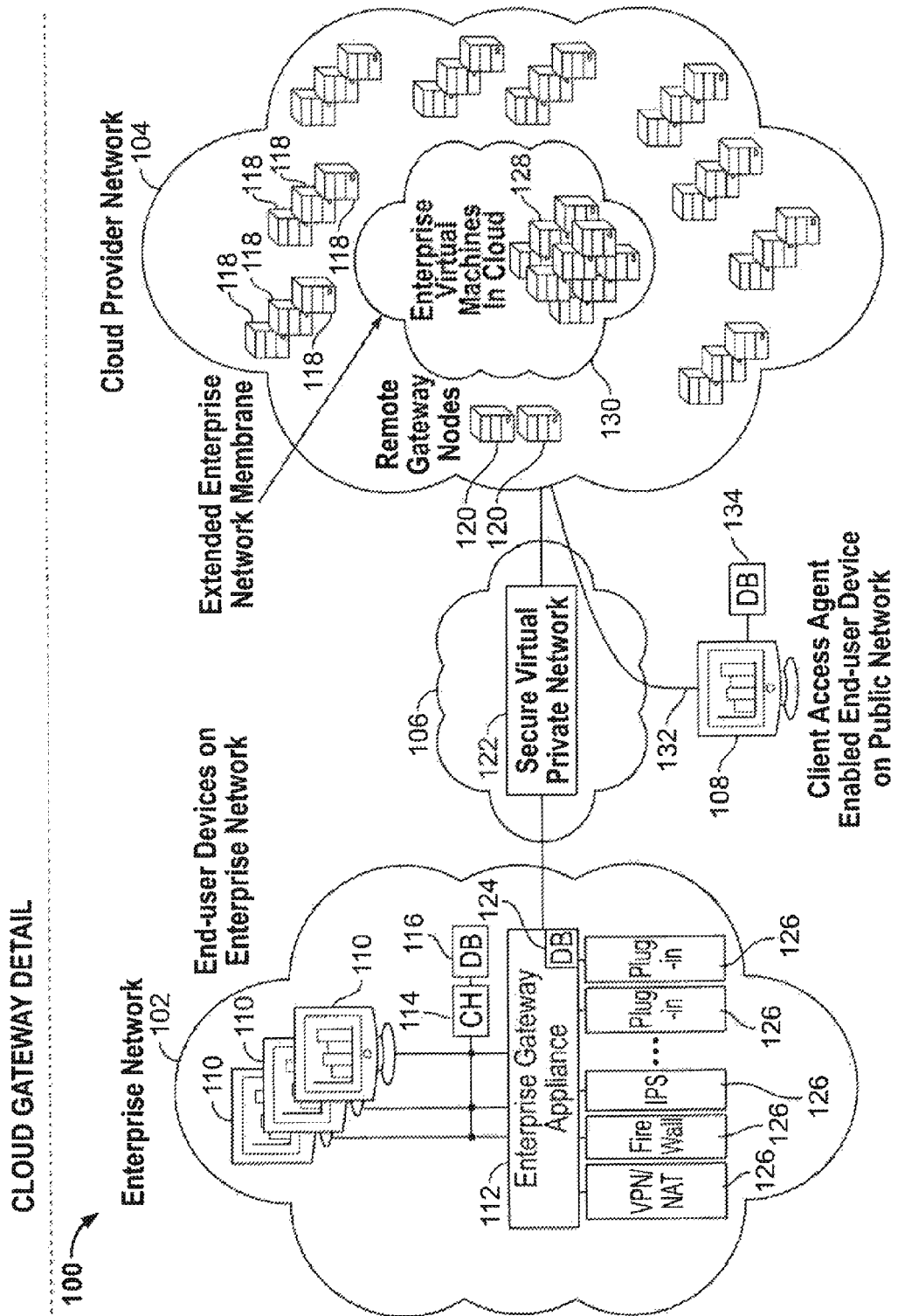

FIG. 7

Client Access Agent 700 mobile network services tool 705

FIG. 8

Mobile End-User Database 800 plug-ins database 805 client database 810

CLOUD COMPUTING GATEWAY, CLOUD COMPUTING HYPERVISOR, AND METHODS FOR IMPLEMENTING SAME

CROSS REFERENCE TO RELATED APPLICATIONS

This application is a continuation of U.S. patent application Ser. No. 12/488,424, filed Jun. 19, 2009, claims the benefit of and incorporates by reference U.S. Provisional Application No. 61/074,027, filed on Jun. 19, 2008 and entitled "Cloud Computing Gateway and Cloud Computing Hypervisor."

BACKGROUND

Field of the Invention

The present invention pertains generally to the field of cloud computing. More particularly, the invention pertains to systems and methods for managing cloud infrastructure and communicating with cloud provisioning and management tools.

Technical Background

Companies have begun offering businesses a new cloud computing outsourcing option that promises reduced costs, improved availability, improved scalability, and reduced time to deploy new applications. These companies act as managed service providers that rent virtual computer, storage, and Internet connectivity services for variable periods on a pay-per-use basis from large pools of repurposable, multi-tenant computing resources. Such cloud infrastructure providers include Amazon Web Services, Joyent, and Mosso.

Many businesses, however, are currently unable to use cloud infrastructure because of a lack of security, control, and manageability of the computing capacity rented from the cloud infrastructure providers. These problems prevent such businesses from maximizing their use of cloud infrastructure, which includes virtual server instances, storage, and Internet bandwidth. In particular, many enterprise IP networks deploy a protective control layer or "enterprise network membrane" to repel external threats, detect intrusions, authorize access, govern and audit activity, and ensure manageability. Unless the business has an administrator or other agent working with the cloud infrastructure provider, the enterprise network membrane does not extend to the cloud infrastructure.

It thus should be appreciated from the foregoing description that there is a need for an improved system and method for managing cloud infrastructure and communicating with cloud provisioning and management tools that addresses the difficulties described above. The present invention satisfies this need and provides further related advantages.

SUMMARY OF THE INVENTION

In accordance with an embodiment, the present invention provides a cloud gateway system, a cloud hypervisor system, and methods for implementing same. The cloud gateway system extends the security, manageability, and quality of service ("QoS") membrane of a corporate enterprise network into cloud infrastructure provider networks, enabling cloud infrastructure to be interfaced as if it were on the enterprise network. The cloud hypervisor system provides an interface to cloud infrastructure provider management systems and infrastructure instances that enables existing enterprise systems management tools to manage cloud infrastructure substantially the same as they manage local virtual machines via common server hypervisor APIs (application programming interfaces).

Thus, an embodiment of the invention provides a technology that enables cloud infrastructure to be addressable by users and administrators of on-premises software systems and systems management systems, as though the cloud infrastructure were resident in private enterprise datacenters on the business' private enterprise networks. The technology allows businesses to take advantage of commercial cloud infrastructure without unduly sacrificing security, control, and manageability, and without an administrator or other agent to work with the cloud infrastructure provider.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIG. 1A is a block diagram of a network system, in accordance with an embodiment of the present invention.

FIG. 7 is a block diagram of a client access agent, in accordance with an embodiment of the present invention.

FIG. 8 is a block diagram of a mobile end-user database for the client access agent of FIG. 7, in accordance with an embodiment of the present invention.

DETAILED DESCRIPTION OF THE INVENTION

The following description is provided to enable any person skilled in the art to make and use the invention.

Various modifications to the embodiments are possible, and the generic principles defined herein may be applied to these and other embodiments and applications without departing from the spirit and scope of the invention. Thus, the invention is not intended to be limited to the embodiments and applications shown, but is to be accorded the widest scope consistent with the principles, features, and teachings disclosed herein.

Network System

Figure 1B:
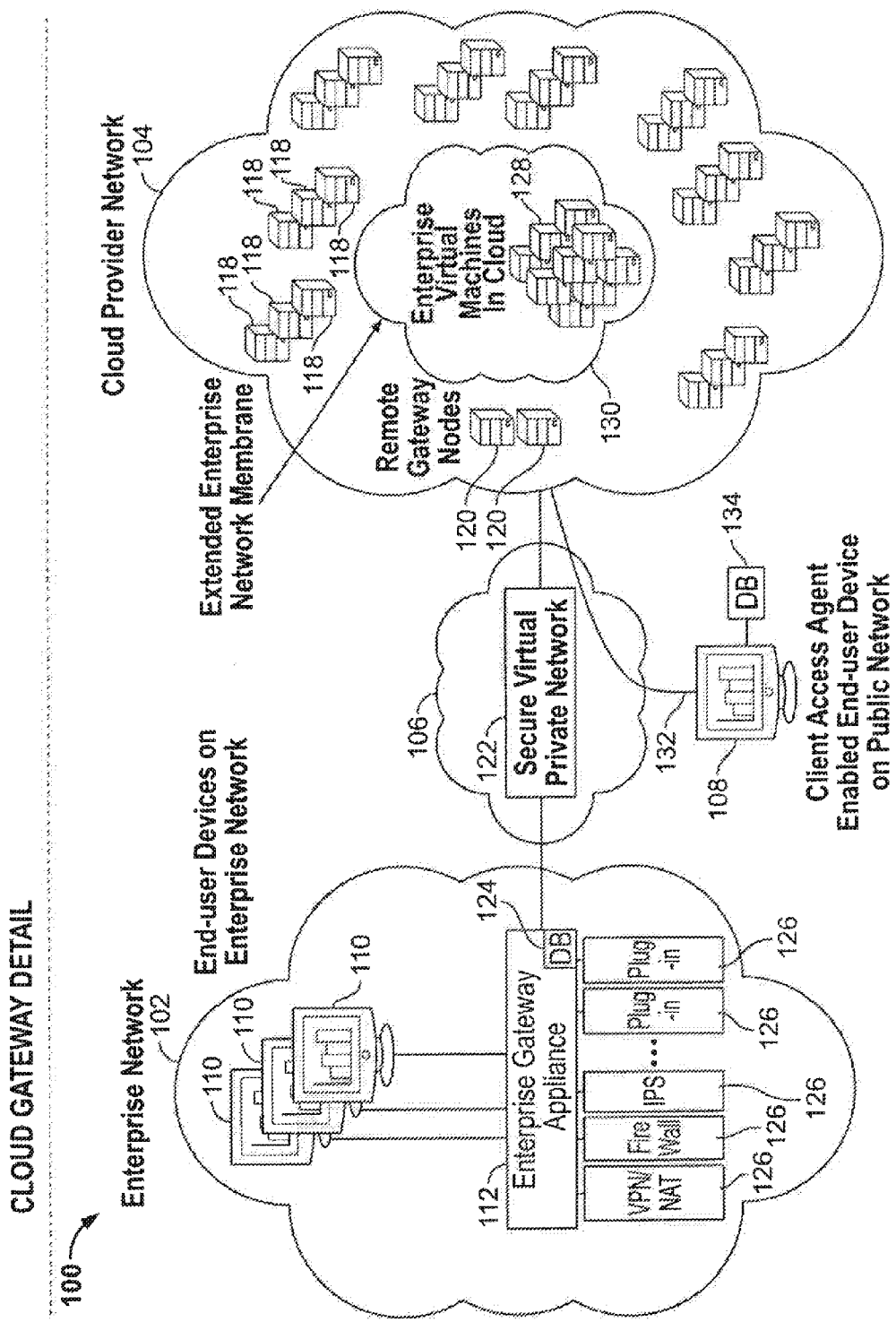
FIG. 1B is a block diagram of a network system omitting a cloud hypervisor system, in accordance with an embodiment of the present invention.

Referring now to the drawings, and particularly to FIGS. 1A and 1B, there is shown a block diagram of a network system 100, in accordance with an embodiment of the present invention. The network system 100 comprises an enterprise network 102, at least one cloud provider network 104, and a wide-area public network 106 (such as the Internet) that connects the enterprise network 102 to the cloud provider network 104. One or more mobile end-user devices 108 may optionally be connected via the public network 106 to the cloud provider network 104. Although FIGS. 1A and 1B show only one cloud provider network 104, it will be appreciated that the enterprise network 102 may be connected to a plurality of cloud provider networks.

The enterprise network 102 comprises a plurality of network end-user devices 110, an enterprise gateway appliance 112, and a cloud hypervisor system 114, which will be described in further detail below. The enterprise gateway appliance 112 may be configured as a physical appliance, as installable software, or as a virtual appliance instance, such as an application software stack packaged as a virtual machine ("VM"). Multiple enterprise gateway appliances 112 on the same enterprise network 102 can work together to provide redundancy from single appliance failure, and scalability to manage increased throughput. The cloud hypervisor system 114 may be coupled to a cloud hypervisor database 116. The cloud hypervisor system 114 may optionally be configured as a plug-in to the enterprise gateway appliance 112 or omitted altogether (as shown in FIG. 1B), as the circumstances warrant.

The cloud provider network 104 comprises a plurality of virtual machines 118. The virtual machines 118 are software implementations of a computer that can be deployed by a hypervisor system and execute programs similar to a physical computer. One or more of the virtual machines 118 are configured as remote gateway nodes 120. Multiple remote gateway nodes 120 work together to provide redundancy from single node failure and scalability to support increased throughput. Enterprise gateway appliances 112 in multiple enterprise networks 102, and remote gateway nodes 120 in multiple cloud provider networks 104 can all work together in a mesh to create an overlay virtual private network with associated plug-in network services 126 that spans a plurality of enterprise networks 102 and cloud networks 104 in a secure and redundant manner.

In one embodiment, the enterprise gateway appliance 112 includes hardware, software, and/or firmware generally operative to upload remote gateway software for the remote gateway nodes 120 to the cloud provider network 104, and to install the remote gateway software on one or more virtual machines 118. The enterprise gateway appliance 112 also includes hardware, software, and/or firmware generally operative to establish a secure virtual private network ("VPN") 122 over the public network 106, connecting the enterprise gateway appliance 112 to the remote gateway nodes 120, and subsequently to the enterprise virtual machines 128. Once the virtual private network 122 has been established, the enterprise gateway appliance 112 functions as the primary ingress and egress point for all network traffic traveling between the enterprise network 102 and the cloud provider network 104. The enterprise gateway appliance 112 may be coupled to an enterprise gateway database 124 capable of storing the remote gateway software for the remote gateway nodes 120. A pluggable network services layer may be provided by the enterprise gateway appliance 112, supporting plug-ins 126 such as virtual private network, network address translation ("NAT"), routing, firewall, load balancing, caching, wide-area network ("WAN") acceleration, intrusion detection and intrusion prevention services ("IPS"), denial of service detection and remediation, network access control, SSL acceleration, logfile aggregation, and policy-based governance and auditing of user and administrative actions.

In one embodiment, the remote gateway nodes 120 include hardware, software, and/or firmware generally operative to establish secure encrypted connections to open VPN agents on one or more virtual machines 118, thus converting these virtual machines 118 into enterprise virtual machines 128 in the cloud provider network 104. The remote gateway nodes 120 are deployed from the remote gateway software uploaded over the public network 106 from the enterprise gateway appliance 112 and are configured as virtual appliances that run on one or more virtual machines 118 in the cloud provider network 104. Once installed, the remote gateway nodes 120 maintain the virtual private network 122 with the enterprise gateway appliance 112 and the enterprise virtual machines 128 in the cloud provider network 104. The remote gateway nodes 120 thus establish an extended enterprise network membrane 130 around the enterprise virtual machines 128. The remote gateway nodes 120 also host the remote components of plug-in network services 126 that must be local to the cloud infrastructure. Further, the remote gateway nodes 120 may comprise a remote gateway database (see FIG. 6) capable of storing the remote gateway software, configuration, and state, as well as software, configuration, and state for the remote components of the plug-in network services 126.

In one embodiment, the mobile end-user device 108 includes hardware, software, and/or firmware generally operative to establish a secure mobile virtual private network 132 between the mobile end-user device 108 and the remote gateway nodes 120, and to provide other pluggable network services for the mobile end-user device 108. The mobile virtual private network 132 may be established by a client access agent (see FIG. 7) residing on the mobile end-user device 108. The client access agent enables individual users to access limited cloud services through direct communication with the remote gateway nodes 120 over the public network 106, without going through the enterprise gateway appliance 112. The mobile end-user device 108 may be a laptop computer, a desktop computer, a personal digital assistant ("PDA") such as the BlackBerry Smartphone by Research in Motion, a cellular phone, or any other computing system or device configured to be connected to a public network. The mobile end-user device 108 may be coupled to a mobile end-user database 134 capable of storing software for the pluggable network services.

The enterprise gateway appliance and remote gateway nodes thus function to provide a virtual private network overlay connecting one or more private enterprise networks to one or more cloud provider networks. Because the remote gateway nodes extend the enterprise network membrane around the enterprise virtual machines in the cloud provider networks, the enterprise virtual machines appear and behave as if they were part of the private enterprise networks, without substantial reduction in the security or manageability of the enterprise network. The enterprise gateway appliance and remote gateway nodes provide the necessary services to help in ensuring that the privacy, security, availability, quality of service, and manageability of the enterprise network is extended to the enterprise virtual machines in the cloud provider network.

General Computer

Figure 2:
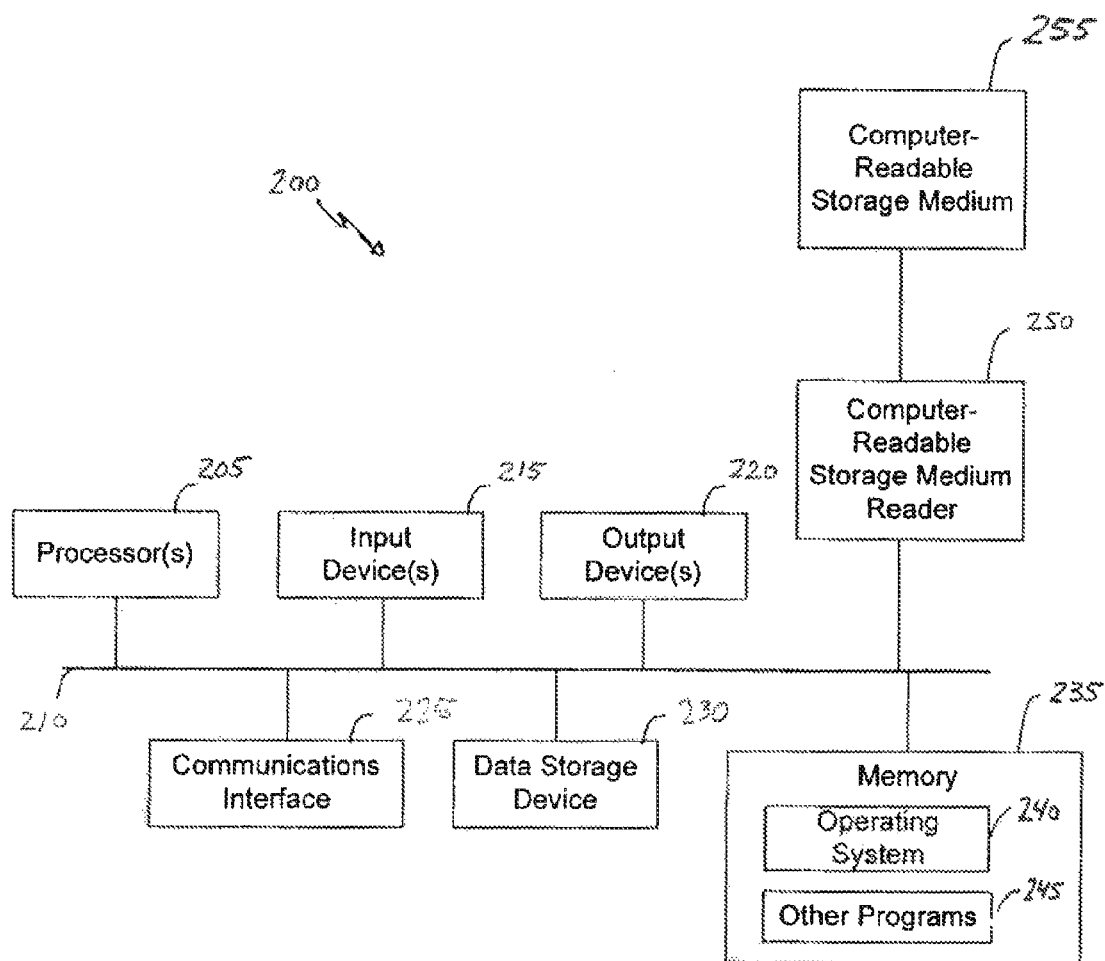
FIG. 2 is a block diagram of a computer system, in accordance with an embodiment of the present invention.

With reference to FIG. 2, there is shown a block diagram of a computer system 200. Each of the mobile end-user devices 108, network end-user devices 110, enterprise gateway appliance 112, cloud hypervisor system 114, and remote gateway nodes 120 may be an instance of the computer system 200. In other embodiments, each of these elements, along with the virtual machines 118 and enterprise virtual machines 128, may be configured as a software implementation running on one or more computer systems 200.

The computer system 200 includes a processor 205, such as an Intel Pentium®. microprocessor or a Motorola Power PC® microprocessor, coupled to a communications channel 210. The computer system 200 further includes an input device 215 (such as a keyboard or mouse), an output device 220 (such as a liquid crystal display or a cathode ray tube display), a communication interface 225, a data storage device 230 (such as a magnetic or optical disk), and memory 235 (such as random access memory (RAM)), each coupled to the communications channel 210. The communication interface 225 may be coupled to the enterprise network 102, a cloud provider network 104, and/or the wide-area public network 106. One skilled in the art will recognize that, although the data storage device 230 and memory 235 are shown as different units, the data storage device 230 and memory 235 may be parts of the same unit, distributed units, virtual memory, etc. Further, it will be appreciated that the term "memory" herein is intended to cover all data storage media, whether permanent or temporary.

The data storage device and/or the memory may also store an operating system (not shown), such as Microsoft Windows Vista, Linux, the IBM OS/2 operating system, the MAC OS, or the UNIX operating system. It will be appreciated that embodiments of the present invention may also be implemented on platforms and operating systems other than those mentioned. An embodiment of the present invention may be written using JAVA, C, C++ language, and/or other programming languages, possibly using object oriented programming methodology. The present invention may be built on Ruby on Rails or using Ajax.

One skilled in the art will recognize that the computer system 200 may also include additional components, such as network connections, additional memory, additional processors, local area networks (LANs), and input/output lines for transferring information across a hardware channel, the Internet or an intranet. One skilled in the art will also recognize that the programs and data may be received by and stored in the computer system 200 in alternative ways. For example, a computer-readable storage medium (CRSM) reader 245, such as a magnetic disk drive, hard disk drive, magneto-optical reader, or CPU, may be coupled to the communications channel 210 for reading a computer-readable storage medium (CRSM) 250, such as a magnetic disk, a hard disk, a magneto-optical disk, or RAM. Accordingly, the central server may receive programs and/or data via the CRSM reader.

Enterprise and Remote Gateway Systems

Figure 3:
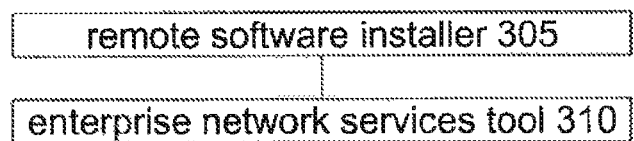
FIG. 3 is a block diagram of an enterprise gateway system, in accordance with an embodiment of the present invention.

With reference to FIG. 3, there is shown a block diagram of an enterprise gateway system 300, in accordance with an embodiment of the present invention. The enterprise gateway system 300 may be implemented on the enterprise gateway appliance 112. The enterprise gateway system 300 includes a remote software installer 305 and an enterprise network services tool 310. The remote software installer 305 includes hardware, software, and/or firmware generally operative to upload the remote gateway software for the remote gateway nodes 120 to the cloud provider network 104, and to install the remote gateway software on one or more virtual machines 118. The enterprise network services tool 310 includes hardware, software, and/or firmware generally operative to establish the secure and redundant virtual private network 122 with multiple remote gateway nodes 120, multiple enterprise gateways appliances 112, and multiple enterprise virtual machines 128 over the public network 106 and to provide other network services supported by the plug-ins 126.

Figure 4:
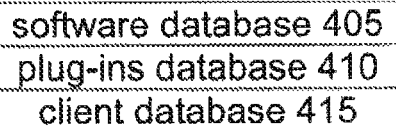
FIG. 4 is a block diagram of an enterprise gateway database for the enterprise gateway system of FIG. 3, in accordance with an embodiment of the present invention.

The enterprise gateway system 300 may be coupled to an enterprise gateway database, such as the enterprise gateway database 400 shown in FIG. 4. The enterprise gateway database 400 comprises a software database 405 that stores the remote gateway software for the remote gateway nodes 120, a plug-ins database 410 that stores software for the plug-ins 126, and a client database 415 that stores enterprise virtual machine client data (such as connection state, routing tables, credentials, and consolidated log files) required to manage the VPN 122 and pluggable network services 126.

Figure 5:
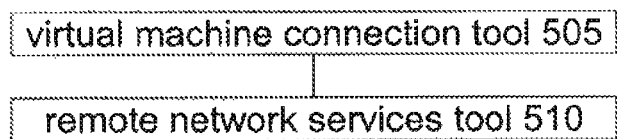
FIG. 5 is a block diagram of a remote gateway system, in accordance with an embodiment of the present invention.

With reference to FIG. 5, there is shown a block diagram of a remote gateway system 500, in accordance with an embodiment of the present invention. The remote gateway system 500 may be implemented on the remote gateway nodes 120. The remote gateway system 500 includes a virtual machine connection tool 505 and a remote network services tool 510. The virtual machine connection tool 505 includes hardware, software, and/or firmware generally operative to establish enterprise virtual machines 128 in the cloud provider network 104 and extending the enterprise network membrane around the enterprise virtual machines 128. The remote network services tool 510 includes hardware, software, and/or firmware generally operative to maintain the secure virtual private network 122 from the enterprise gateway appliance 112, over the public network 106, to the enterprise virtual machines 128 in the cloud network provider 104, and to execute the remote components of the plug-in network services 126 that must be local to the cloud infrastructure.

Figure 6:
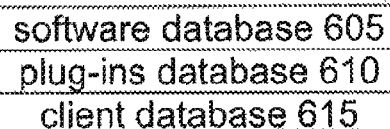
FIG. 6 is a block diagram of a remote gateway database for the remote gateway system of FIG. 5, in accordance with an embodiment of the present invention.

The remote gateway system 500 may be coupled to a remote gateway database, such as the remote gateway database 600 shown in FIG. 6. The remote gateway database 500 may be implemented on the remote gateway nodes 120. The remote gateway database 500 comprises a software database 610 that stores the remote gateway software, a plug-ins database 610 that stores software for the pluggable network services provided by the remote network services tool 510, and a client database 615 that stores enterprise virtual machine 128 client data (such as connection state, routing tables, credentials, and consolidated log files) required to manage the VPN 122 and pluggable network services 126.

With reference to FIG. 7, there is shown a block diagram of a client access agent 700, in accordance with an embodiment of the present invention. The client access agent 700 may be implemented on a mobile end-user device 108. The client access agent 700 includes a mobile network services tool 705. The mobile network services tool 705 includes hardware, software, and/or firmware generally operative to establish the secure mobile virtual private network 132 over the public network 106 and to provide other pluggable network services for the mobile end-user device 108.

The client access agent 700 may be coupled to a mobile end-user database, such as the mobile end-user database 800 shown in FIG. 8. The mobile end-user database 800 comprises a plug-ins database 805 that stores software for the pluggable network services provided by the mobile network services tool 705 and a client database 810 that stores virtual machine client data (such as connection state, routing tables, credentials, and consolidated log files) required to manage the VPN and pluggable network services.

Cloud Hypervisor System

Figure 9:
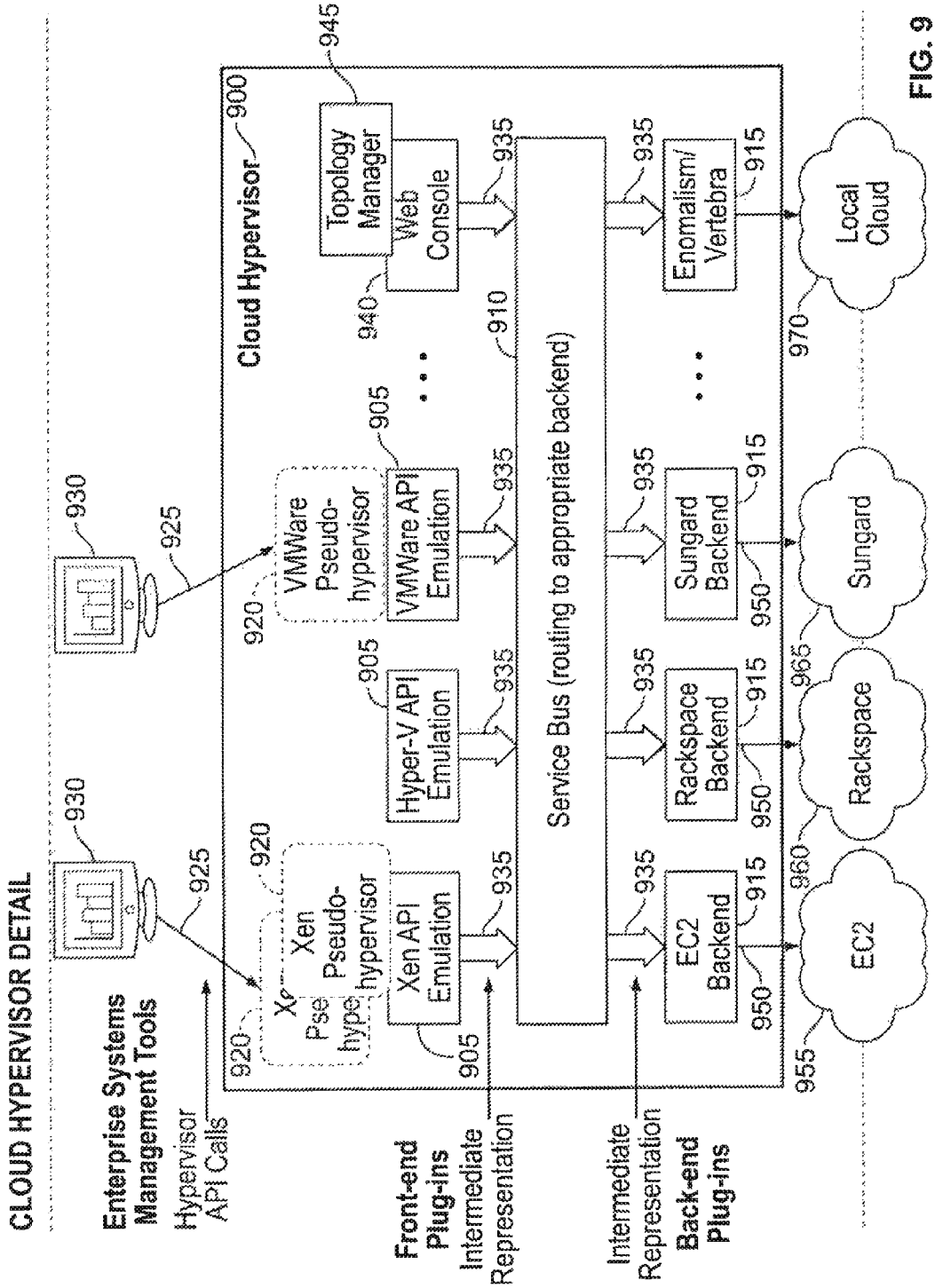
FIG. 9 is a block diagram of a first embodiment of a cloud hypervisor system, in accordance with an embodiment of the present invention.

With reference to FIG. 9, there is shown a block diagram of a first embodiment of a cloud hypervisor system 900, in accordance with an embodiment of the present invention. The cloud hypervisor system 900 includes a set of front-end plug-ins 905, a service bus 910, and a set of back-end plug-ins 915.

Each front-end plug-in 905 includes hardware, software, and/or firmware generally operative to establish one or more pseudo-hypervisor instances 920, to expose the pseudo-hypervisor instances 920 to the enterprise network 102, to listen for and receive hypervisor API calls 925 from enterprise systems management tools 930, to translate received hypervisor API calls into intermediate representations 935, and to place the intermediate representations 935 on the service bus 910 as a transaction. For each transaction issued to the service bus 910, a response code will be returned to the pseudo-hyper visor 920 that will be passed back to the calling enterprise systems management tool 930. In general, a server hypervisor is a low-level computer operating system configured to emulate one or more physical systems to create one or more virtual machines, each virtual machine capable of hosting a high-level computer operating system like Microsoft Windows or Linux. A server hypervisor thus functions to enable multiple high-level computer operating systems to share a single physical computer system without interfering with each other. Commercial examples of server hypervisors include VMWare ESX server, Microsoft Hyper-V, and Citrix XenServer. Instances 920 are referred to as pseudo-hypervisor instances because the front-end plug-in 905 is emulating the provisioning and management interfaces of a commercial server hypervisor, effectively tricking the enterprise systems management tools 930 into believing that they are communicating with a common commercial server hypervisor instead of the cloud hypervisor system 900.

In one embodiment, each server hypervisor API supported on the enterprise network 102 has a corresponding front-end plug-in 905. In general, a hypervisor exposes a management API that is used by provisioning and management tools to monitor the virtual machines associated with the hypervisor and to instruct the hypervisor to create, destroy, or change the state of the virtual machines. Thus, in one embodiment, there is one front-end plug-in 905 for each supported server hypervisor API. It will be appreciated that, in other embodiments, only some of the supported server hypervisor APIs will have a corresponding front-end plug-in 905.

Each front-end plug-in 905 thus is configured to expose one or more unique pseudo-hypervisor instances 920 to the enterprise network 102, to translate each received hypervisor API call 925 into an intermediate representation 935, and to place the intermediate representation 935 on the service bus 910 as a transaction. Once the transaction has been executed by the service bus 910, the service bus 910 will return a result code to the pseudo-hypervisor indicating the state of the transaction for response to the calling enterprise systems management tool 930. In one embodiment, each pseudo-hypervisor instance 920 is associated with a single account at a cloud provider. In other embodiments, a pseudo-hypervisor instance 920 may be associated with a plurality of cloud provider accounts, and a cloud provider account may be associated with a plurality of pseudo-hypervisor instances 920.

The set of front-end plug-ins 905 may also comprise a web console 940 that graphically exposes cloud infrastructure management functions and a topology manager 945 that includes infrastructure topology creation and deployment tools. The web console 940 and topology manager 945 plug into the service bus 910, and either issue instructions directly using the intermediate representation 935, or translate their API calls into intermediate representations 935 so that they can interact with any supported cloud infrastructure through the service bus 910 and back-end plug-ins 915.

The service bus 910 includes hardware, software, and/or firmware generally operative to route each intermediate representation 935 from a front-end plug-in 905 to an appropriate back-end plug-in 915. Each intermediate representation 935 is a generic representation that can be understood by any of the back-end plug-ins 915. In one embodiment, a destination parameter is passed with each intermediate representation 935, indicating the cloud provider network account to which the intermediate representation 935 should ultimately be routed. In other embodiments, the destination parameter indicates the route to the back-end plug-in 915 to which the intermediate representation 935 should proximately be routed. Routing the intermediate representation 935 is implemented by the service bus 910 as a transaction through the backend plug-in 915. The service bus 910 is responsible for ensuring the success of the cloud API call 950, and collecting, remediating and reporting any events that occur during the execution of the cloud API call 950. Upon successful or failed completion of the cloud API call 950, the service bus 910 is responsible for generating and routing a response code back to the calling pseudo-hypervisor 920 in an intermediate representation.

Each back-end plug-in 915 includes hardware, software, and/or firmware generally operative to translate an intermediate representation 935 into a cloud API call 950. In one embodiment, each unique supported cloud provider network account (such as the EC2 cloud provider network account 955, the Rackspace cloud provider network account 960, and the Sungard cloud provider network account 965) has a unique API and a corresponding back-end plug-in 915. It will be appreciated that, in other embodiments, each unique supported cloud provider network account might have a plurality of corresponding back-end plug-ins 915, or one back-end plug-in 915 might support a plurality of cloud provider network accounts. It will also be appreciated that one or more back-end plug-ins 915 could be configured to translate an intermediate representation 935 into the API for a local cloud, such as local cloud 970. The back-end plug-in 915 is responsible for executing the transaction specified by the intermediate representation, validating success of the transaction, collecting events from the cloud API, and reporting the final state of the transaction back to the service bus 910.

The cloud hypervisor system thus acts as a proxy between enterprise systems management tools that are instrumented to work with server hypervisor APIs and the APIs provided by cloud provisioning and management tools or cloud infrastructure providers. The cloud hypervisor system functions to generalize the interface to all cloud infrastructure provisioning and management systems and services by emulating the widely supported provisioning and management interfaces of popular server hypervisors, such as Xen, VMWare ESX and Microsoft Hyper-V. In one embodiment, the cloud hypervisor system enables enterprise systems management tools (such as VMWare Virtual Center and Lab Manager, Microsoft SCVMM, Citrix XenCenter, BMC Bladelogic, IBM Tivoli Provisioning Manager, Novell Platespin, VMLogix LabManager, Surgient, and Scalent) to interact with cloud infrastructure management APIs (such as those of Amazon Web Services, Rackspace, IBM Blue Cloud, Google AppEngine, 3tera AppLogic, Sun, VMWare vCloud, Citrix C3, and Eucalyptus). The cloud hypervisor system does this by emulating server hypervisor APIs, making the enterprise systems management tools believe they are communicating with a common server hypervisor, but then translating the server hypervisor API calls into equivalent cloud API calls. The cloud hypervisor system emulates as much of each server hypervisor's API as is required to satisfy the requirements of known enterprise systems management tools. Emulated operations may include, but are not limited to, discover, create, delete, start, stop, suspend, resume, get configuration, set configuration, and get state.

Figure 10:
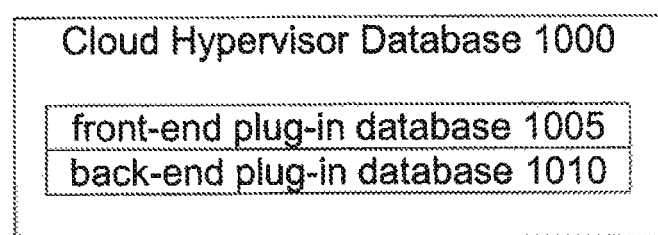
FIG. 10 is a block diagram of a cloud hypervisor database for the cloud hypervisor system of FIG. 9, in accordance with an embodiment of the present invention.

The cloud hypervisor system 900 may be coupled to a cloud hypervisor database, such as the cloud hypervisor database 1000 shown in FIG. 10. The cloud hypervisor database 1000 comprises a front-end plug-in database 1005 that stores software for set of front-end plug-ins 905 and a back-end plug-in database 1010 that stores software for the set of back-end plug-ins 915, as well as execution data such as execution logs, credentials, and execution state.

Figure 11:
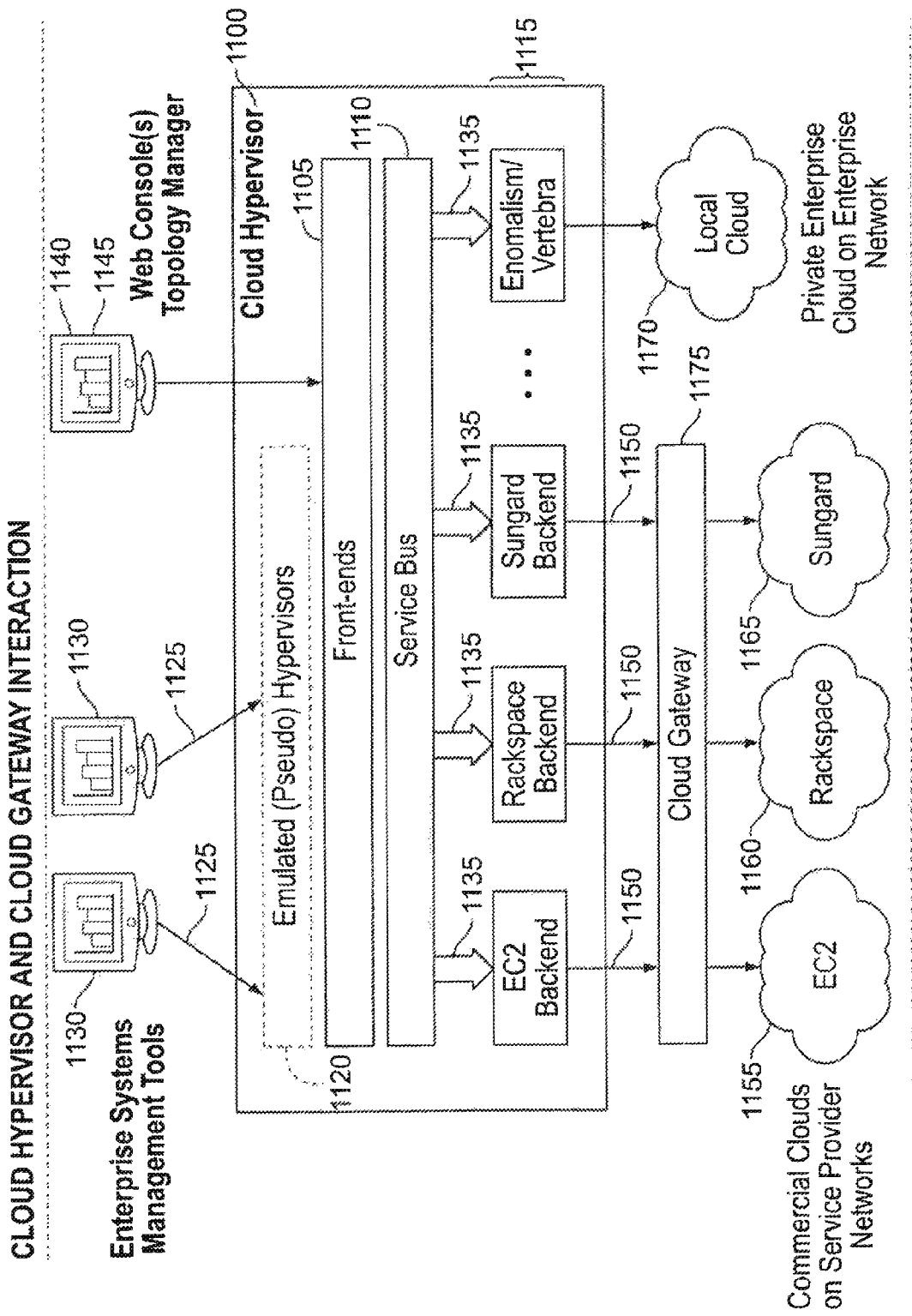
FIG. 11 is a block diagram showing the interaction between the cloud hypervisor system of FIG. 9 and a cloud gateway system.

With reference to FIG. 11, there is shown a block diagram showing the interaction between a cloud hypervisor system 1100 and a cloud gateway system 1175. The elements of the cloud hypervisor system 1100 correspond to the elements of the cloud hypervisor system 900, except that in FIG. 11 the web console 1140 and topology manager 1145 are shown as tools that are distinct from the cloud hypervisor system 1100.

In particular, the cloud hypervisor system 100 includes a set of front-end plug-ins 1105, a service bus 1110, and a set of back-end plug-ins 1115. Each front-end plug-in 1105 includes hardware, software, and/or firmware generally operative to establish a set of pseudo-hypervisor instances 1120, to expose the pseudo-hypervisor instances 1120 to the enterprise network 102, to listen for and receive hypervisor API calls 1125 from enterprise systems management tools 1130, to translate received hypervisor API calls into intermediate representations 1135, and to place the intermediate representations 1135 on the service bus 1110. Each back-end plug-in 1115 includes hardware, software, and/or firmware generally operative to translate an intermediate representation 1135 into a cloud API call 1150. In one embodiment, each unique supported cloud provider network account (such as the EC2 cloud provider network account 1155, the Rackspace cloud provider network account 1160, and the Sungard cloud provider network account 1165) has a unique API and a corresponding back-end plug-in 1115. It will be appreciated that one or more back-end plug-ins 1115 could be configured to translate an intermediate representation 1135 into the API for a local cloud, such as local cloud 1170.

The cloud gateway system 1175 includes an enterprise gateway appliance (such as enterprise gateway appliance 112) and remote gateway nodes (such as remote gateway nodes 120). Thus, the cloud gateway system 1175 includes hardware, software, and/or firmware generally operative to establish a secure virtual private network over a public network, connecting the cloud hypervisor 1100 to each unique supported cloud provider network account. Once the virtual private network has been established, the cloud gateway system 1175 functions as the primary ingress and egress point for all network traffic traveling between the cloud hypervisor 1100 and the cloud provider network accounts and associated enterprise virtual machines 128. The cloud gateway system 1175 extends the enterprise network membrane around the cloud provider network accounts and associated enterprise virtual machines 128, providing a secure, high-quality, well-managed network connection between the cloud hypervisor system 1100 and commercial cloud infrastructure and making the remote infrastructure appear to be located on the enterprise network.

Figure 12:
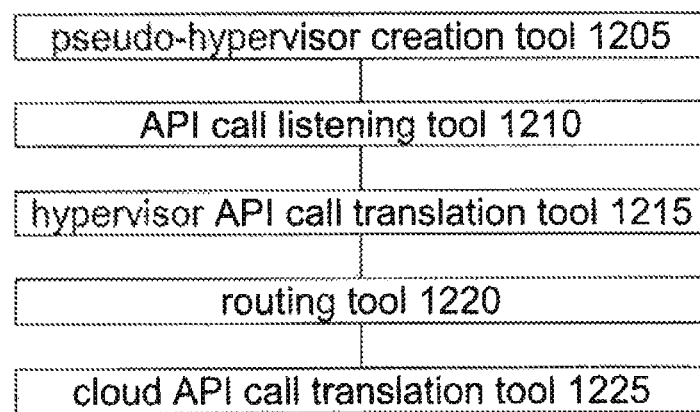
FIG. 12 is a block diagram of a second embodiment of a cloud hypervisor system, in accordance with an embodiment of the present invention.

With reference to FIG. 12, there is shown a block diagram of a second embodiment of a cloud hypervisor system 1200, in accordance with an embodiment of the present invention. The cloud hypervisor system 1200 includes a pseudo-hypervisor creation tool 1205, an API call listening tool 1210, a hypervisor API call translation tool 1215, a routing tool 1220, and a cloud API call translation tool 1225.

The pseudo-hypervisor creation tool 1205 includes hardware, software, and/or firmware generally operative to establish one or more pseudo-hypervisor instances (such as pseudo-hypervisor instances 920) and to expose the pseudo-hypervisor instances to the enterprise network 102. The API call listening tool 1210 includes hardware, software, and/or firmware generally operative to listen for and receive hypervisor API calls sent by enterprise systems management tools (such as enterprise systems management tools 930) to the pseudo-hypervisor instances. The hypervisor API call translation tool 1215 includes hardware, software, and/or firmware generally operative to translate received hypervisor API calls into intermediate representations (such as intermediate representations 935) and to transmit the intermediate representations to the routing tool 1220. The routing tool 1220 includes hardware, software, and/or firmware generally operative to route each intermediate representation from the hypervisor API call translation tool 1215 to the cloud API call translation tool 1225. The cloud API call translation tool 1225 includes hardware, software, and/or firmware generally operative to translate an intermediate representation 935 into a cloud API call 950.

Method for Managing Cloud Infrastructure

Figure 13:
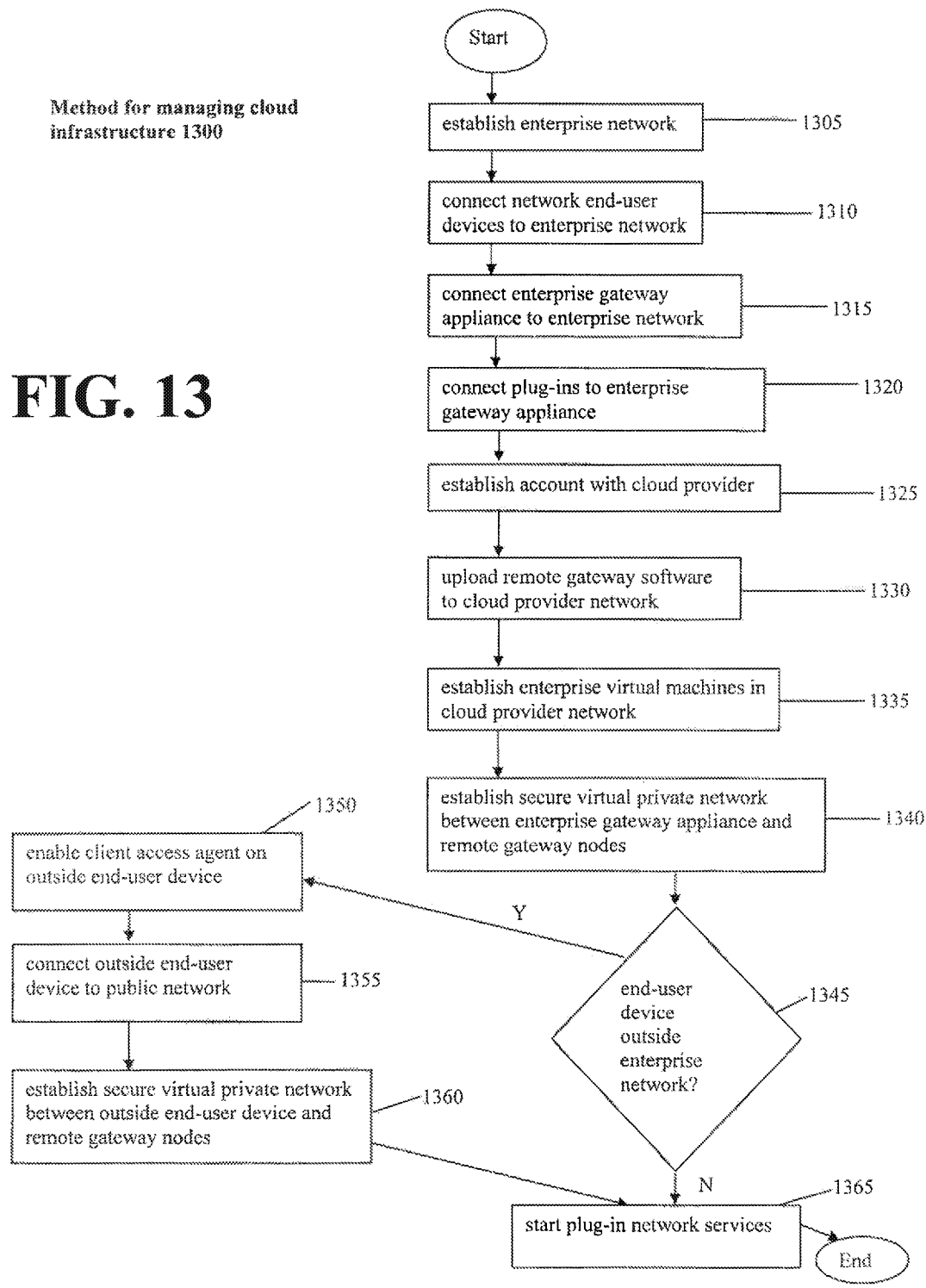
FIG. 13 is a flowchart of a method for managing cloud infrastructure, in accordance with an embodiment of the present invention.

With reference to FIG. 13, there is shown a flowchart of a method 1300 for managing cloud infrastructure, in accordance with an embodiment of the present invention. The method 1300 starts in step 1305 with the establishment of an enterprise network (such as enterprise network 102). In step 1310, network end-user devices (such as network end-user devices 110) are connected to the enterprise network. In step 1315, an enterprise gateway appliance (such as enterprise gateway appliance 112) is also connected to the enterprise network. In step 1320, network service plug-ins (such as plug-ins 126) are connected to the enterprise gateway appliance.

In step 1325, an account is established with a cloud provider. In step 1330, the enterprise gateway appliance uploads remote gateway software to one or more remote gateway nodes (such as remote gateway nodes 120) in the cloud provider network. In step 1335, the remote gateway nodes establish secure encrypted connections to open VPN agents on one or more virtual machines, thus converting these virtual machines 118 into enterprise virtual machines (such as enterprise virtual machines 128) in the cloud provider network. In step 1340, a secure virtual private network is established between the enterprise gateway appliance, the remote gateway nodes, and the enterprise virtual machines.

In step 1345, it is determined whether there is an end-user device outside the enterprise network. If there are no outside end-user devices, then the method 1300 proceeds to step 1365. If there is an outside end-user device (such as mobile end-user device 108), then a client access agent is enabled on the outside end-user device in step 1350. In step 1355, the outside end-user device is connected to a public network. In step 1360, a secure virtual private network is established between the outside end-user device and the remote gateway nodes.

In step 1365, plug-in network services are started and service specific sessions between the plug-ins connected to the enterprise gateway appliance and the remote gateway notes are established. This step can be repeated for each plug-in. The method 1300 then ends.

Method for Communicating with Cloud Accounts

Figure 14:
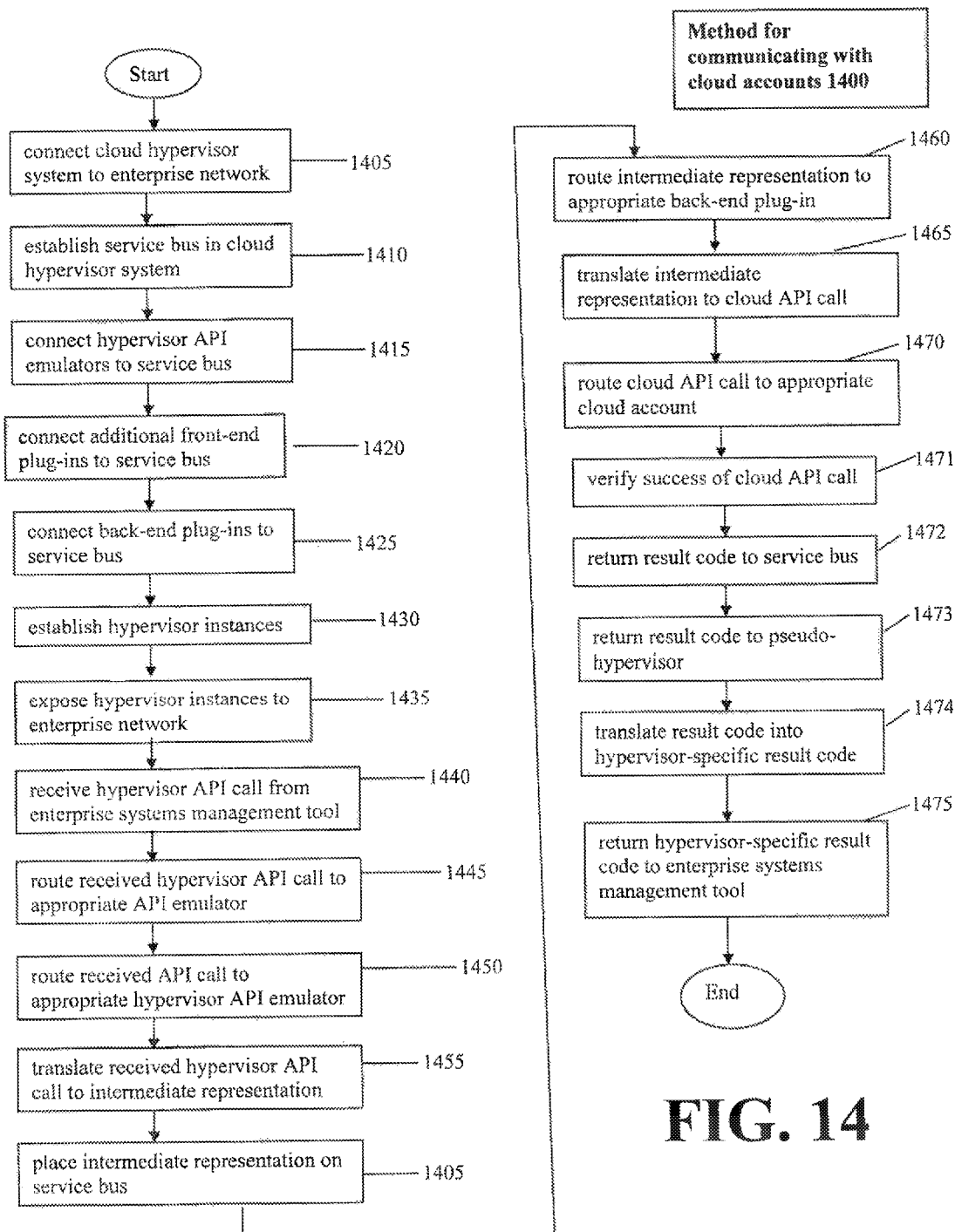
FIG. 14 is a flowchart of a method for communicating with cloud accounts, in accordance with an embodiment of the present invention.

With reference to FIG. 14, there is shown a flowchart of a method 1400 for communicating with cloud accounts, in accordance with an embodiment of the present invention. The method 1400 starts in step 1405, where a cloud hypervisor system (such as a cloud hypervisor system 900, 110 or 1200) is connected to an enterprise network. In step 1410, a service bus (such as a service bus 910 or 1110) is established in the cloud hypervisor system. In step 1415, hypervisor API emulators (such as front-end plug-ins 905 or 1105) are connected to the service bus. In step 1420, additional front-end plug-ins (such as web console 940 and topology manager 945) are connected to the service bus. In step 1425, back-end plug ins (such as back-end plug-ins 915 or 1115) are connected to the service bus.

In step 1430, the hypervisor API emulators establish one or more pseudo-hypervisor instances (such as pseudo-hypervisor instances 920 or 1120). In step 1435, the pseudo-hypervisor instances are exposed to the enterprise network. In step 1440, a pseudo-hypervisor instance receives a hypervisor API call (such as a hypervisor API call 925 or 1125) from an enterprise systems management tool. In step 1445, the pseudo-hypervisor instance routs the received hypervisor API call to the appropriate hypervisor API emulator. In step 1450, the hypervisor API emulator translates the received hypervisor API call into an intermediate representation (such as intermediate an representation 935 or 1135). In step 1455, the hypervisor API emulator places the intermediate representation on the service bus. In step 1460, the service bus routes the intermediate representation to the appropriate back-end plug-in. In step 1465, the back-end plug-in translates the intermediate representation into a cloud API call (such as a cloud API call 950 or 1150). In step 1470, the cloud API call is routed to an appropriate cloud account. In step 1471, the back-end plug-in verifies success of the cloud API call. In step 1472, the back-end plug-in returns a result code to the service bus in an intermediate representation. In step 1473, the service bus returns the result code to the pseudo-hypervisor. In step 1474, the pseudo-hypervisor translates the intermediate representation result code into a hypervisor specific result code. In step 1475, the hypervisor specific result code is returned to the calling enterprise systems management tool. The method then ends.

The foregoing description of the preferred embodiments of the present invention is by way of example only, and other variations and modifications of the above-described embodiments and methods are possible in light of the foregoing teaching. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A cloud gateway system comprising:
an enterprise gateway system located in an enterprise network and comprising:
a software installer configured to upload remote gateway software to a cloud provider network and to install the remote gateway software on a first virtual machine in the cloud provider network, the cloud provider network comprising a plurality of virtual machines, and
a network services tool configured to establish a virtual private network between the enterprise gateway system and the first virtual machine and to provide plug-in network services having remote components and thereby establishing a pseudo-hypervisor instance in the cloud network; and
a remote gateway system located in the cloud provider network and comprising:
a virtual machine connection tool configured to establish a secure connection between the first virtual machine and a second virtual machine in the cloud provider network, and
a remote network services tool configured to execute the remote components of the plug-in network services.

2. The cloud gateway system of claim 1, wherein the remote gateway system further comprises a virtual machine creation tool configured to create the second virtual machine in the cloud provider network.

3. The cloud gateway of claim 1, further comprising a client access agent located on a mobile device.

4. The cloud gateway system of claim 3, wherein the client access agent comprises a mobile network services tool configured to establish a mobile virtual private network between the mobile device and the second virtual machine and to provide plug-in network services having remote components.

5. A cloud hypervisor system comprising:
a processor;
a pseudo-hypervisor creation tool configured, using the processor, to establish a pseudo-hypervisor instance;
an API call listening tool configured, using the processor to listen for and receive hypervisor API calls;
a hypervisor API call translation tool configured, using the processor, to translate a hypervisor API call received by the API call listening tool into an intermediate representation;

a cloud API translation tool configured, using the processor, to translate an intermediate representation into a cloud API call; and a routing tool configured, using the processor, to route an intermediate representation from the hypervisor API call translation tool to the cloud API translation tool.

6. The cloud hypervisor system of claim 5, wherein the hypervisor API call translation tool is further configured to pass a destination parameter with an intermediate representation.

7. The cloud hypervisor system of claim 6, wherein the destination parameter indicates a cloud provider network account.

8. The cloud hypervisor system of claim 6, wherein the destination parameter indicates a route to the cloud API translation tool.

9. The cloud hypervisor system of claim 5, wherein the hypervisor API call translation is further configured to a return a response code to a pseudo-hypervisor instance.

10. The cloud hypervisor system of claim 5, wherein the pseudo-hypervisor instance is associated with an account at a cloud infrastructure provider.

11. The cloud hypervisor system of claim 5, wherein the routing tool is further configured to return a result code to a pseudo-hypervisor instance after routing an intermediate representation.

12. The cloud hypervisor system of claim 5, wherein the routing tool is further configured to return a result code to a pseudo-hypervisor instance upon a failure to complete the routing of an intermediate representation.

13. The cloud hypervisor system of claim 5, wherein the cloud API translation tool corresponds to cloud provider account.

14. The cloud hypervisor system of claim 5, further comprising a web console configured to plug into the routing tool and graphically expose cloud infrastructure management functions.

15. The cloud hypervisor system of claim 5, further comprising a topology manager configured to plug into the routing tool, wherein the topology manager includes an infrastructure topology creation tool and an infrastructure topology deployment tool.

16. A method for managing cloud infrastructure, the method comprising:

uploading remote gateway from an enterprise network to a cloud provider network, the cloud provider network comprising a plurality of virtual machines;

installing the remote gateway software on a first virtual machine in the cloud provider network;

establishing a pseudo-hypervisor instance in the cloud network;

establishing a virtual private network between the enterprise network and the first virtual machine;

establishing a secure connection between the first virtual machine and a second virtual machine in the cloud provider network; and executing plug-in network services on the first virtual machine.

17. The method of claim 16, further comprising the steps of:

enabling a client access agent on a device outside the enterprise network and cloud provider network;

connecting the device to a public network; and establishing a virtual network between the device and one or both of the first virtual machine and the second virtual machine.

18. A method for communicating with cloud accounts, the method comprising:

establishing a pseudo-hypervisor instance on an enterprise network;

configuring the pseudo-hypervisor instance to receive a hypervisor API call from an enterprise systems management tool on the enterprise network;

translating a received hypervisor API call into an intermediate representation;

routing the intermediate representation to a back-end plug-in; translating the intermediate representation into a cloud API call; and transmitting the cloud API call to a cloud provider network for delivery to a cloud account.

19. The method of claim 18, further comprising the step of verifying successful execution of the cloud API call.

20. The method of claim 19, further comprising the step of reporting verification information concerning the cloud API call to the pseudo-hypervisor instance.

21. The method of claim 20, further comprising the step of translating the verification information into a hypervisor-specific result code.

22. The method of claim 21, further comprising the step of reporting the hypervisor-specific result code to an enterprise systems management tool.

* * * * *